UNITED STATES PATENT OFFICE 2,380,063

CYANOMETHYL CINNAMATES

David T. Mowry, Dayton, Ohio, assignor to Monsanto Chemical Company, St. Louis, Mo., a corporation of Delaware No Drawing. Application September 27, 1943,
Serial No. 504,050

3 Claims. (Cl. 260—465)

The present invention relates to new esters of glycolonitrile, more particularly to esters of glycolonitrile with cinnamic acid or alpha-substituted cinnamic acid, and to methods of producing the same.

This invention has as an object the provision of useful, new esters of glycolonitrile. Another object of the invention is the preparation of new, unsaturated esters of glycolonitrile capable of forming polymers and copolymers for use in the plastic and coating industries.

These objects are accomplished by the following invention wherein there are prepared unsaturated esters of glycolonitrile having the general formula:

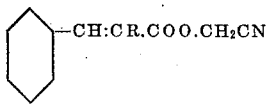

wherein R is a member of the group consisting of hydrogen and methyl. Examples of compounds having the above general formula are cyanomethyl cinnamate and cyanomethyl alpha-methylcinnamate.

These new esters are readily obtainable by reaction of glycolonitrile with a cinnamoyl halide or an alpha-methylcinnamoyl halide according to the equation:

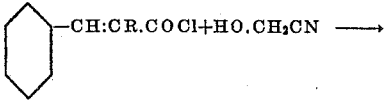

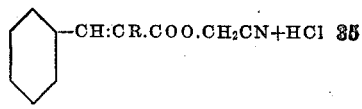

wherein R stands for hydrogen or a methyl group.

Cyanomethyl cinnamate and cyanomethyl alpha-methylcinnamate are also obtainable by reaction of a cinnamoyl halide or an alpha-methylcinnamoyl halide with a mixture of formaldehyde and an alkali metal cyanide such as potassium cyanide or sodium cyanide substantially according to the following equation:

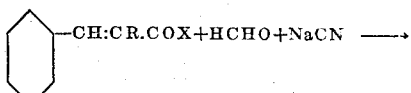

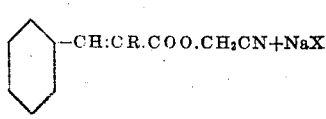

wherein R stands for a methyl group or hydrogen, and X stands for halogen.

As examples of the acyl halides that may be employed in the two reactions given above may be mentioned cinnamoyl chloride, cinnamoyl bromide, cinnamoyl fluoride, cinnamoyl iodide, alpha-methylcinnamoyl chloride, alpha-methylcinnamoyl bromide, alpha-methylcinnamoyl fluoride, or alpha-methylcinnamoyl iodide.

Still another method for the preparation of cyanomethyl cinnamate or cyanomethyl alpha-methylcinnamate involves the dehydrohalogenation of cyanomethyl beta-phenyl-beta-chloropropionate or cyanomethyl beta-phenyl-beta-chloro-alpha-methylpropionate, for example, by heating in the presence of quinoline or another basic reacting organic or inorganic compound. Cyanomethyl beta-phenyl-beta-chloropropionate or cyanomethyl beta-phenyl-beta-chloro-alpha-methylpropionate are first prepared by reaction of beta-phenyl-beta-chloropropionyl chloride or beta-chloro-alpha-methyl propionyl chloride with a mixture of formalin and an alkali metal cyanide, and the chloro-esters are then dehydrohalogenated, substantially according to the series of reactions:

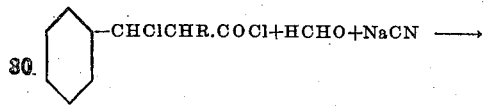

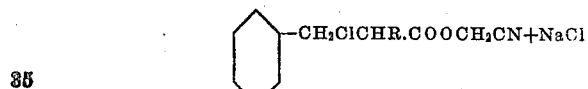

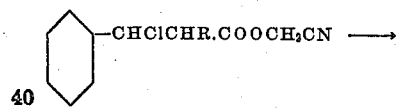

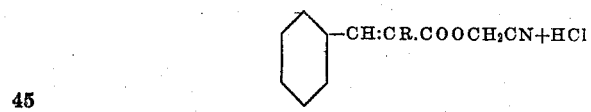

In the above series of reactions, R stands for hydrogen or a methyl group.

While a number of saturated esters of glycolonitrile are known, as far as I have been able to ascertain, the cinnamate and the alpha-methylcinnamate of glycolonitrile have not been previously prepared. Glycolonitrile, itself, polymerizes rather rapidly to a colorless crystalline mass, and in the prior art its esters were generally prepared by indirect methods, i. e., glycolonitrile was not employed as a constituent of the reaction mixture in reactions involving the preparation of its esters. For example, Henry (Bull. soc. chim. (2) 46, 42; Rec. trav. chim. 24, 170) prepared the acetate, the propionate and the butyrate of glycolonitrile by reaction of chloroacetonitrile with the potassium salt of acetic acid, propionic acid or butyric acid, respectively. In the preparation of the benzoate of glycolonitrile the nitrile was formed in situ, benzoyl chloride being reacted with a mixture of potassium cyanide and formaldehyde instead of with glycolonitrile (J. Aloy and C. Rabaut, Bull. soc. chim. (4) 13, 457–60). Only in the preparation of the carbonates has glycolonitrile been previously employed as an esterifiable alcohol. In U. S. Patents Nos. 2,266,199 and 2,307,679, Hechenbleikner reacts glycolonitrile with phosgene to obtain dicyanomethyl carbonate or cyanomethyl chloroformate, respectively. It is well known, however, that phosgene is an especially reactive acyl halide and that its reactivity is not necessarily typical of other acyl halides. Since no acyl halide other than phosgene has been previously reacted with glycolonitrile to yield esters thereof, the production of unsaturated esters of glycolonitrile by reaction of the same with unsaturated acyl halides could not have been anticipated.

Also, although an aromatic carboxylic acid ester of glycolonitrile, i. e., the benzoate, has been previously prepared by reaction of the acyl halide with a mixture of an alkali metal cyanide and formaldehyde in aqueous solution, the course of a parallel reaction with an aralkyl unsaturated, instead of an aromatic acyl halide could not have been predicted. Many unsaturated acyl halides are known to undergo auto-condensation or polymerization in the presence of alkaline reagents. Moreover, the production of complex cyanohydrins, instead of the cinnamate or the alpha-methylcinnamate of glycolonitrile would have been expected to occur by addition of hydrogen cyanide at the olefinic double bond of the cinnamoyl halide or the alpha-methylcinnamoyl halide. The production of the cinnamate or the alpha-methylcinnamate of glycolonitrile by reaction of an aqueous mixture of formaldehyde and an alkali metal cyanide with a cinnamoyl halide or an alpha-methylcinnamoyl halide consequently could not have been predicted.

Cyanomethyl cinnamate and cyanomethyl alpha-methylcinnamate are somewhat high-boiling, colorless liquids. The present esters form highly valuable copolymers when mixtures of monomers of the same with other polymerizable materials are subjected to polymerizing conditions. Resinous products of improved thermal characteristics and high mechanical strength are obtained by polymerizing mixtures comprising the present esters with other unsaturated compounds, for example, styrene or other vinyl-substituted aromatic hydrocarbons or their derivatives such as alpha-methyl-styrene, alpha,para-dimethylstyrene, vinylnaphthalene, alpha-chlorostyrene, para-ethylstyrene, para-chlorostyrene or vinylphenol; vinyl-substituted heterocyclic compounds such as vinylfuran or vinylcarbazole; acrylic or methacrylic acids or their esters, nitriles or amides such as methyl methacrylate, acrylonitrile or methacrylamide; alpha,beta-unsaturated dicarboxylic acids or their esters, anhydrides or nitriles such as maleic anhydride, diethyl maleate or fumaronitrile; vinyl esters of aliphatic acids such as vinyl acetate, vinyl chloroacetate or vinyl butyrate; vinyl halides such as vinyl chloride or vinyl fluoride, vinylidene halides such as vinylidene chloride, vinylidene fluoride or diolefinic hydrocarbons or their derivatives such as butadiene, isoprene, chloroprene or cyclopentadiene, etc. Resins prepared by the copolymerization of the present unsaturated esters of glycolonitrile in admixture with polymerizable compounds such as those mentioned above are characterized by substantial insolubility in all the usual organic solvents. They possess high melting points and a high degree of non-flammability. They are useful in the plastics industry, generally, and are particularly useful as molding compounds and in the preparation of fire-resistant coating and impregnating compositions.

The invention is further illustrated, but not limited, by the following examples:

*Example 1*

Cyanomethyl alpha-methylcinnamate. — 90 grams (0.5 mol) of alpha-methylcinnamoyl chloride in 60 cc. of dioxane was dropped into a briskly stirred solution of 31 grams (0.6 mol) of sodium cyanide and 48 cc. (0.55 mol) of formalin in 300 cc. of water, keeping the temperature at from 5° C. to 10° C. When addition was complete, the material was stirred for an additional hour at room temperature and finally for 15 minutes in a Waring blender. The reaction mixture was extracted with ether and the ether extract was washed with aqueous sodium carbonate, then with water, and finally with dilute hydrochloric acid. Upon evaporation of the ether and distillation of the product under partial vacuum there was obtained 63 grams (63% theoretical yield) of the substantially pure cyanomethyl alpha-methyl-cinnamate, B. P. 162° C.–163° C./3 mm., a pale, yellow oil, $n_D^{25}$ 1.5669, which analyzed as follows:

| | Percent C | Percent H | Percent N |
|---|---|---|---|
| Calcd. for $C_{12}H_{11}O_2N$ | 71.62 | 5.52 | 6.96 |
| Found | 72.36 | 5.73 | 6.87 |

Cyanomethyl alpha-methylcinnamate copolymerizes with styrene, methyl methacrylate or acrylonitrile to give clear, colorless, hard resins which are non-flammable and highly resistant to solvents. When copolymerized with butadiene, isoprene or chloroprene, very heat-resistant rubbery products are obtained.

*Example 2*

Cyanomethyl cinnamate.—28.5 grams (0.5 mol) of glycolonitrile was added slowly to a mixture of 91 grams of cinnamoyl chloride (0.55 mol) and 60 grams of dimethylaniline (0.5 mol) in 50 cc. of anhydrous ether while the reactants were kept with stirring at a temperature of from 5° C. to 10° C. After warming to room temperature and stirring for one hour, the material was diluted with two volumes of ether and washed with water and an aqueous solution of sodium carbonate. The ether layer was subsequently washed with aqueous solutions of sodium carbonate and hydrochloric acid and then evaporated to yield 48 grams of a crude yellowish product having a melting point of about 50° C. This product was then distilled at a pressure of 4 mm. of mercury and a temperature of 164° C.–165° C., the distillate crystallizing in the receiver to a pale yellow solid. Recrystallization of the solid from dilute alcohol gave 25 grams of white plates, M. P. 60° C.–62° C.

A second recrystallization gave 24 grams of large, transparent, lustrous plates of substantially pure cyanomethyl cinnamate, M. P. 62.5° C.-63.0° C., and analyzing as follows:

|  | Percent C | Percent H | Percent N |
|---|---|---|---|
| Calcd. for $C_{11}H_9O_2N$ | 70.6 | 4.84 | 7.48 |
| Found | 70.69 | 4.74 | 7.63 |

When subjected to polymerizing conditions in admixture with monomeric styrene, for example, in a 1:5 mixture with styrene at a temperature of 80° C. for 3 days, cyanomethyl cinnamate copolymerizes with styrene to give hard, water-clear, colorless, resins having a high degree of non-inflammability, a great resistance to organic solvents and good mechanical strength.

While I prefer to use the acyl halides in the preparation of cyanomethyl cinnamate or cyanomethyl alpha-methyl-cinnamate, I may also employ the corresponding acid anhydrides, particularly when reaction is effected with the glycolonitrile instead of with a mixture of formaldehyde and alkali metal cyanide. Good results are obtained, for example, in the preparation of cyanomethyl cinnamate by reaction of cinnamic anhydride with glycolonitrile. Anhydrides may also be employed in the reaction when a mixture of alkali metal cyanide and formaldehyde is used instead of glycolonitrile. However, in this case, the reaction is preferably conducted under anhydrous conditions, employing the acid anhydride in excess in order to act as diluent and using gaseous formaldehyde instead of formalin. In working under anhydrous conditions, hydrogen cyanide may be used instead of the alkali metal cyanide. Hydrogen cyanide may also be substituted for the alkali metal cyanide, wholly or in part, when reacting the unsaturated acyl halide or acid anhydride with an aqueous mixture of formalin and cyanide.

While cyanomethyl cinnamate and cyanomethyl alpha-methyl cinnamate are particularly contemplated for use in the production of resinous materials, they also find use either as insecticides and fungicides or as intermediates in the preparation of materials having insecticidal, fungicidal, rot-proofing and water-proofing properties.

From the foregoing disclosure it will be recognized that the invention is susceptible of modification without departing from the spirit and scope thereof, and it is to be understood that the invention is limited only by the following claims.

What I claim is:

1. Compounds having the formula:

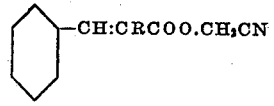

where $R$ is a member of the group consisting of hydrogen and methyl.

2. Cyanomethyl cinnamate.
3. Cyanomethyl alpha-methylcinnamate.

DAVID T. MOWRY.